Feb. 8, 1944.  J. C. TROTTER  2,341,400
ORDNANCE
Filed Jan. 12, 1942  2 Sheets-Sheet 1
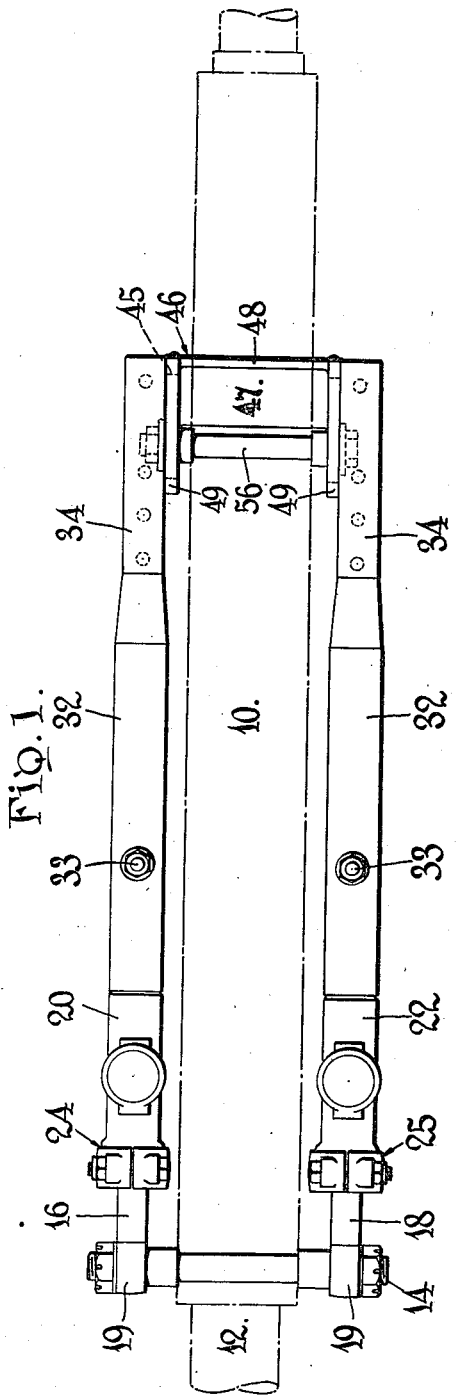
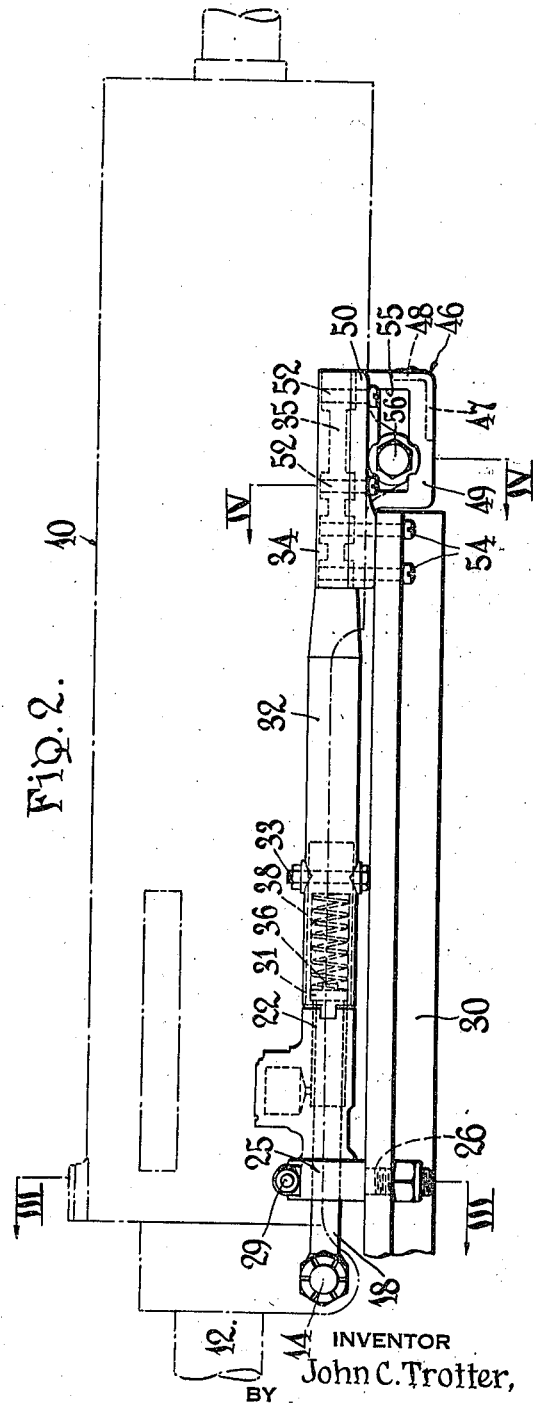
INVENTOR
John C. Trotter,
BY
Beau, Brooks, Buckley & Beau.
ATTORNEYS Feb. 8, 1944.    J. C. TROTTER    2,341,400
ORDNANCE
Filed Jan. 12, 1942    2 Sheets-Sheet 2
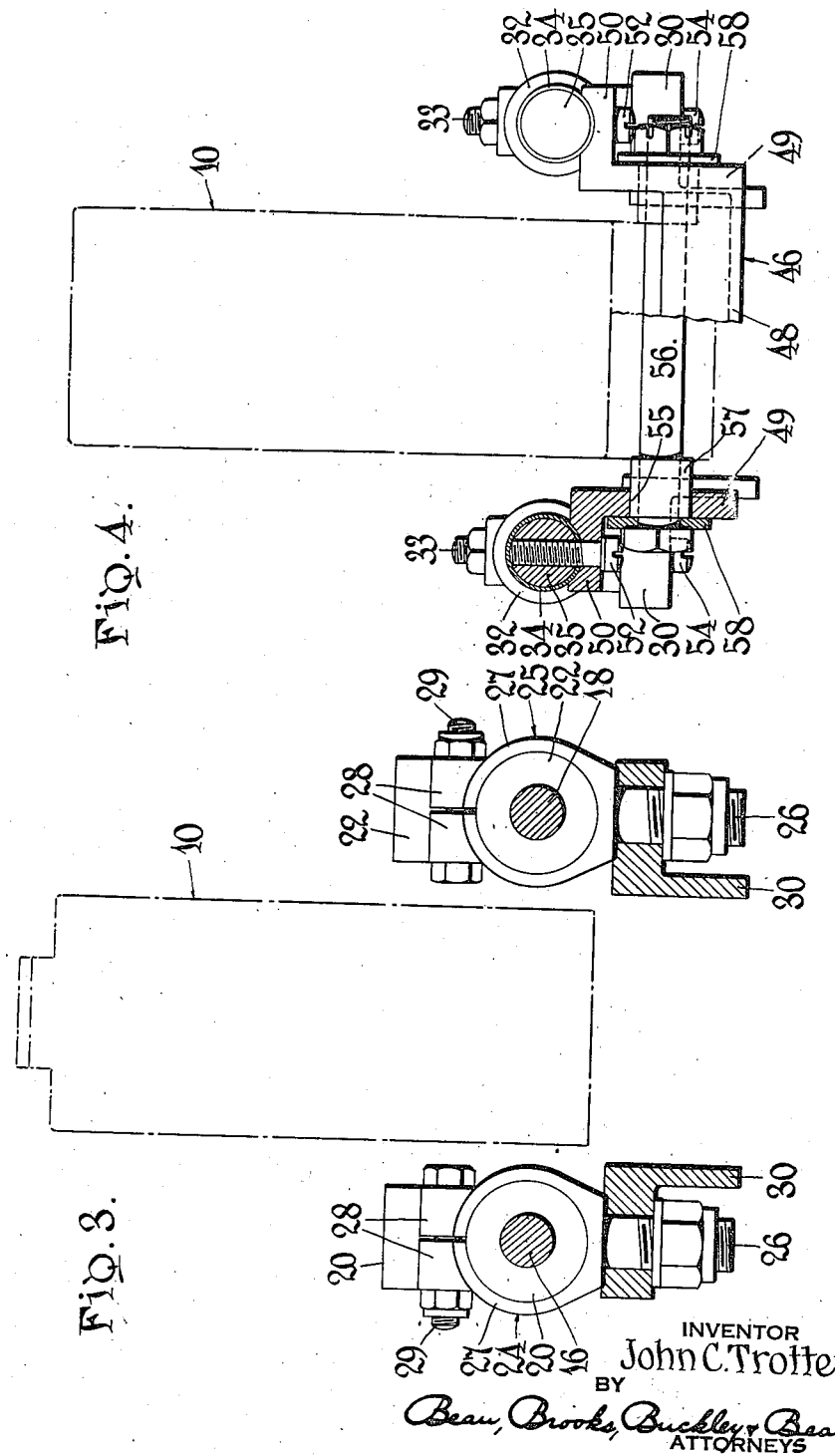
INVENTOR
John C. Trotter,
BY
Bean, Brooks, Buckley & Bean
ATTORNEYS Patented Feb. 8, 1944

2,341,400

UNITED STATES PATENT OFFICE 2,341,400

ORDNANCE

John C. Trotter, Williamsville, N. Y., assignor to Bell Aircraft Corporation, Buffalo, N. Y.

Application January 12, 1942, Serial No. 426,377

9 Claims. (Cl. 89—37)

This invention relates to ordnance, and more particularly to improvements in devices for mounting rapid fire guns such as machine guns or the like upon moving vehicles or stationary bases. The invention provides particular improvements with respect to machine gun mount devices which incorporate as integral parts thereof recoil shock absorbing and return stroke mechanisms; and it is a primary object of the present invention to provide an improved gun mount including a hydraulic recoil shock absorbing and compression spring counter-recoil mechanism having improved means for connecting the mount assembly to a stationary base support. Another object of the invention is to provide a rapid fire gun mount device embodying structural improvements whereby such devices may be more economically manufactured and are adapted to be connected to fixed bases of various forms in an improved manner. Other more specific objects and advantages of the invention will appear from the specification hereinafter.

In the drawings:

Fig. 3 is a section, on an enlarged scale, taken substantially along line III—III of Fig. 2; and Fig. 4 is a section, on an enlarged scale, taken substantially along line IV—IV of Fig. 2.

Figures 1, 2:
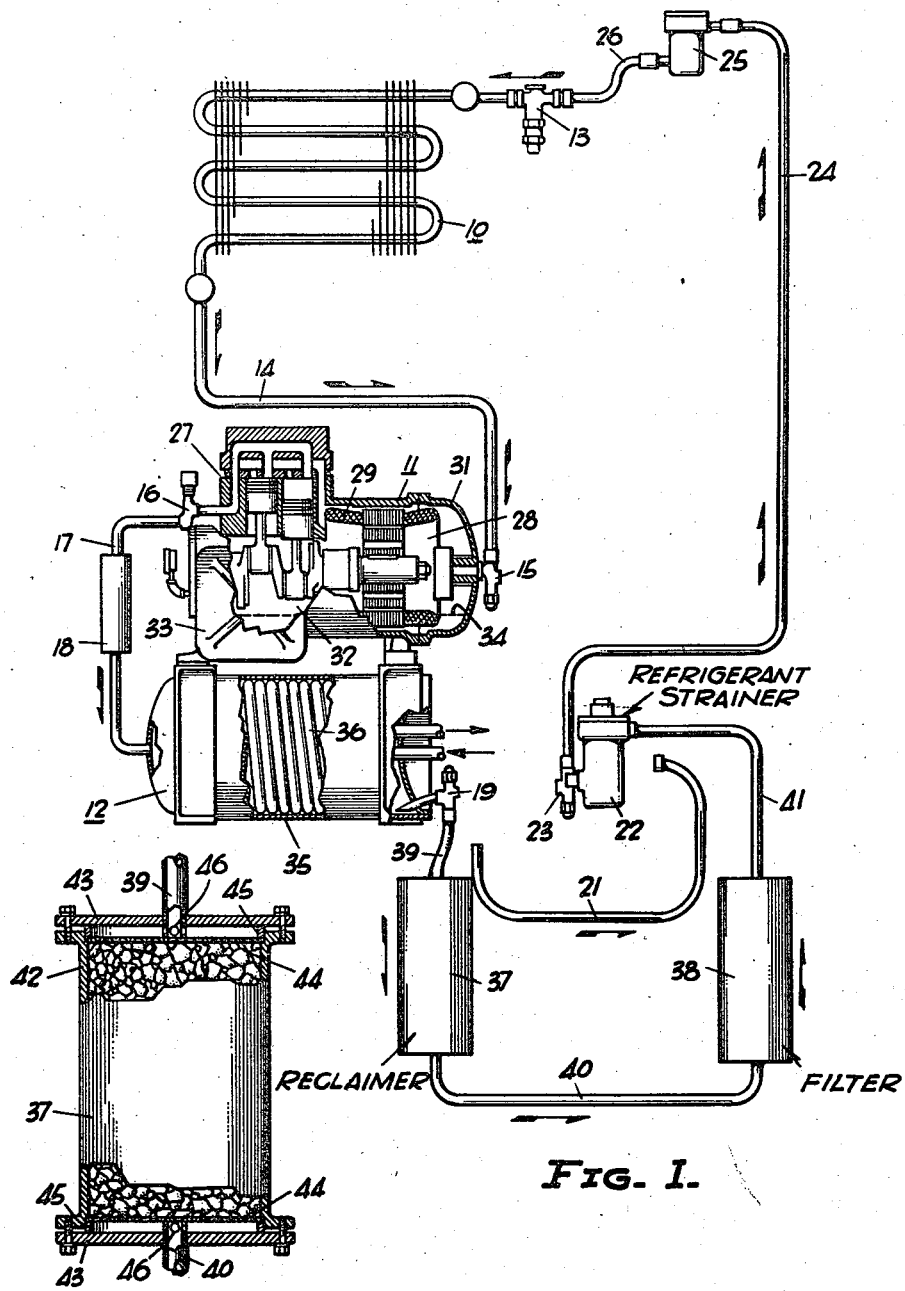
Fig. 1 is a top plan of a machine gun mount of the invention, having a machine gun indicated by broken lines as being mounted thereon.
Fig. 2 is a side elevational view corresponding to Fig. 1.

The drawings illustrate the invention embodied in a gun mount device supporting a machine gun which is designated generally at 10 and as having a gun barrel indicated at 12. A transverse bolt 14 is carried by the front end portion of the gun casing structure so as to extend at opposite sides thereof to engage corresponding outer end portions of a pair of plungers 16—18 by being threaded through eye portions of the plungers as indicated at 19—19. The plungers 16—18 extend into corresponding cylinder devices 20—22 arranged to lie parallel to the gun casing 10 at opposite sides thereof. Adjacent their forward end portions the cylinder devices 20—22 are embraced by a pair of corresponding clamps 24—25 which each comprise a threaded stem portion 26 and a split eye upper portion 27 terminating in opposite apertured lugs 28 for receiving clamping bolts 29 in transversely threaded relation therethrough for fixing the clamps 24—25 upon the corresponding cylinder devices 20—22 during final assembly of the gun mount structure. The stem portions 26 of the clamps 24—25 are arranged to extend rigidly from a pair of corresponding base rails 30—30 of a support structure which may be conveniently provided, as shown, of stock angle section structural steel material, or the like, the rails 30—30 being disposed so as to lie parallel to the longitudinal axis of the gun and at opposite sides therebelow. It will of course be understood that the mounting rails 30—30 will be extended lengthwise to any degree as may be required in any case to provide for mounting thereof upon any other supporting structure; as in connection, for example, with the mounting of the gun upon any stationary base or moving vehicle, or the like.

The cylinders 20—22 are arranged to embody suitable oil chambers for coaction with corresponding pistons 31—31 mounted upon the plungers 16—18 so as to provide the required recoil shock absorbing action, as is well understood in the ordance art. The cylinders 20—22 telescopically engage at their rear end portions with a pair of corresponding mounting tubes 32—32, and are rigidly and detachably connected thereto by means of bolts 33—33. At their rear end portions the tubes 32—32 are reduced as at 34—34, and are each fitted with a filler or reinforced plug 35 to solidify the circular sectional form thereof.

Each of the piston devices 31—31 is fitted with a check valve 36, and in each case a compression spring 38 is seated at one end against the corresponding piston 31 and at its other end against the closed rear end portion of the corresponding cylinder. Thus, it will be understood that the piston-cylinder units are adapted to absorb the recoil shock forces of the gun firing operation and to provide return movement of the gun to normal position between each firing operation; and that the oil flow control valve operation will function to damp both the recoil and counter-recoil strokes of the plungers relative to the cylinders. Thus, the entire recoil shock absorbing and counter-recoil movement providing and reciprocation damping functions are arranged to be provided by a pair of structurally simple and compact plunger-cylinder units located adjacent the forward end of the gun casing and at opposite sides thereof.

A cross bracket 46 having a transverse plate portion 47; a back plate portion 48; and a pair of upwardly extending side plate portions 49—49 terminating in outwardly bent flange portions 50—50 is mounted to extend beneath the gun casing 10 adjacent the rear end thereof into registry with the tube portions 34—34. The bracket 46 is firmly bolted to the tube portions 34—34 by means of machine screws 52 which extend into screw thread connected relation with suitably drilled and tapped portions of the corresponding tube plugs 35—35. Other screws 54—54 connect the corresponding base rails 30—30 to the bracket and tube assembly. The side plate portions 49—49 of the bracket 46 are longitudinally slotted as indicated at 55 to engage oppositely extending end portions of a transverse bolt 56 in slidable relation. The bolt 56 is mounted firmly upon the gun casing structure as by being threaded through suitably apertured lug portions thereof; and thus it will be understood that the gun is mounted upon the gun mount device adjacent the rear end portion of the gun by means of the bolt 56 which is freely slidable relative to the gun mount structure in directions longitudinally of the gun.

Therefore, the gun is mounted at both the forward and rear end portions thereof so as to be freely reciprocable in directions longitudinally of the gun relative to the cylinder-tube-base rail structure, except as it will be restrained from such reciprocation by means of the hydraulic piston-cylinder and compression spring devices referred to hereinabove. The bolt 56 carries a pair of bushings 57 for receiving the wear incidental to reciprocation relative to the slide plate portions 49—49 of the bracket 46; and a corresponding pair of washers 58 are mounted under the headed end portions of the bolt 56 for positioning the bolt transversely relative to the slide control bracket.

Thus, it will be understood that the gun mount of the invention comprises an assembly of structurally simple and easily manufactured units which are particularly adapted to be made in large quantities by economical shop methods; and wherein each unit of the assembly comprises a self-contained device adapted to successfully withstand all loads thereon. In addition, the various units of the assembly are particularly adapted to suit the gun mount structure to be connected to base support devices of various forms without alteration of the structural features thereof. Hence, the gun mount device is substantially universally adapted to be mounted upon any form of moving vehicle or stationary base in an improved manner.

It will be understood that by providing the recoil shock absorbing and counter-recoil units at opposite sides of the gun casing and parallel therewith as illustrated and described hereinabove, the shock absorbing and counter-recoil forces are effectively distributed so that the resultant loads upon the gun and gun mount structures are balanced. It will also be particularly noted that the various unit parts of the gun mount assembly structure are under all conditions readily accessible for inspection, adjustment, repair, or replacement, without substantial disruption of the gun mount arrangement. A still further feature of the invention is that the structure is extremely compact and conforms closely to the configuration of the gun which is mounted thereon. Consequently, use of the gun mount structure of the invention involves no material increase of the gun size or bulk, and in such cases wherein the mounting rails 30—30 may comprise portions of a pivotable supporting structure the gun mount device of the invention avoids substantial interference with the balancing of the gun battery and/or efficient aiming manipulation thereof.

Although only one form of the invention has been shown and described in detail, it will be apparent to those skilled in the art that the invention is not so limited but that various changes may be made therein without departing from the spirit of the invention or the scope of the appended claims.

I claim:

1. A machine gun mount including, a base support comprising a pair of rails arranged to lie parallel to the gun and therebelow, a recoil shock absorbing and counter-recoil force providing unit mounted upon each of said rails, each of said units including a hydraulic recoil shock absorbing and counter-recoil spring containing cylinder and a support tube mounted in end-to-end relation, a clamp embracing each of said cylinders and extending therefrom into fixed connection with the corresponding of said rails, a transverse bracket extending between said tubes at the rear ends thereof and fixedly connected thereto and to said rails so as to provide an integral rail-cylinder-tube-bracket assembly, said bracket being slotted at opposite side wall portions thereof in directions longitudinally of said gun and slidably mounting thereat a transverse bolt connection device extending from the rear end portion of said gun, a pair of piston devices extending rearwardly from said gun into corresponding of said cylinder-tube units for cooperation therewith to support the forward end portion of said gun relative to said base and to provide gun recoil shock absorbing and counter-recoil forces.

2. A machine gun mount including, a base support, a pair of recoil shock absorbing and counter-recoil force providing units arranged to lie parallel to the gun, each of said units including a recoil shock absorbing and counter-recoil force providing device, a clamp embracing each of said units at one end thereof and extending therefrom into fixed connection with said base support, a transverse bracket extending between said units at the other ends thereof and fixedly connected thereto and to said base support so as to provide an integral base-unit-bracket assembly, said bracket being slotted at opposite side wall portions thereof in directions longitudinally of said gun and slidably mounting thereat the rear end portion of said gun, connection devices extending from said gun into operative relation with respect to said units for cooperation therewith to provide support of the forward end portion of said gun relative to said base and recoil shock absorbing and counter-recoil force providing action.

3. A machine gun mount including a base support, a pair of rails mounted upon said base support and arranged to lie parallel to the gun at opposite sides thereof, a recoil shock absorbing and counter-recoil force providing unit mounted upon each of said rails, a clamp embracing each of said units at the front end thereof and extending therefrom into fixed connection with the corresponding of said rails, a transverse bracket extending between said units at the rear ends thereof and fixedly connected thereto and to said rails so as to provide an integral rail-unit-bracket assembly, said bracket being slotted at opposite side wall portions thereof in directions longitudinally of said gun and slidably mounting thereat the rear end portion of said gun, connection devices extending rearwardly from corresponding front end portions of said gun into operative relation with respect to the corresponding of said units for cooperation therewith to provide support of the forward end portion of said gun relative to said base support and recoil shock absorbing and counter-recoil force providing action.

4. In a supporting structure for machine guns, a frame in which the machine gun is mounted for forward and rearward movement, said frame comprising a pair of parallel tubular structures each comprising a front cylinder portion and a rear tube portion telescopically mounted thereon, a plunger operatively connected to the machine gun and extending into each of said cylinder members, gun recoil shock absorbing and counter recoil providing devices disposed within